(12) United States Patent
Schneider

(10) Patent No.: US 8,190,868 B2
(45) Date of Patent: May 29, 2012

(54) MALWARE MANAGEMENT THROUGH KERNEL DETECTION

(75) Inventor: Jerome L. Schneider, Boulder, CO (US)

(73) Assignee: Webroot Inc., Broomfield, CO (US)

( * ) Notice: Subject to any disclaimer, the term of this patent is extended or adjusted under 35 U.S.C. 154(b) by 973 days.

(21) Appl. No.: 11/462,827

(22) Filed: Aug. 7, 2006

(65) Prior Publication Data
US 2008/0034429 A1  Feb. 7, 2008

(51) Int. Cl.
*G06F 21/00* (2006.01)
(52) U.S. Cl. ............ 713/2; 713/164; 713/193; 726/4; 726/22; 726/23; 726/24; 726/25
(58) Field of Classification Search .......... 713/164; 726/2, 4, 23–25
See application file for complete search history.

(56) References Cited

U.S. PATENT DOCUMENTS

| | | |
|---|---|---|
| 5,623,600 A | 4/1997 | Ji et al. |
| 6,069,628 A | 5/2000 | Farry et al. |
| 6,073,241 A | 6/2000 | Rosenberg et al. |
| 6,092,194 A | 7/2000 | Touboul |
| 6,154,844 A | 11/2000 | Touboul |
| 6,167,520 A | 12/2000 | Touboul |
| 6,310,630 B1 | 10/2001 | Kulkarni et al. |
| 6,397,264 B1 | 5/2002 | Stasnick et al. |
| 6,460,060 B1 | 10/2002 | Maddalozzo, Jr. et al. |
| 6,480,962 B1 | 11/2002 | Touboul |
| 6,535,931 B1 | 3/2003 | Celi, Jr. |
| 6,611,878 B2 | 8/2003 | De Armas et al. |
| 6,633,835 B1 | 10/2003 | Moran et al. |
| 6,667,751 B1 | 12/2003 | Wynn et al. |
| 6,701,441 B1 | 3/2004 | Balasubramaniam et al. |
| 6,785,732 B1 | 8/2004 | Bates et al. |
| 6,804,780 B1 | 10/2004 | Touboul |
| 6,813,711 B1 | 11/2004 | Dimenstein |
| 6,829,654 B1 | 12/2004 | Jungek |
| 6,965,968 B1 | 11/2005 | Touboul |
| 7,058,822 B2 | 6/2006 | Edery et al. |

(Continued)

FOREIGN PATENT DOCUMENTS

WO  2006077443  * 7/2006

(Continued)

OTHER PUBLICATIONS

Ya-Min,"Detecting Stealth Software with Strider Ghostbuster",2005,IEEE, Internation Conference on Dependable Systems.*

(Continued)

*Primary Examiner* — Taghi Arani
*Assistant Examiner* — Gregory Lane
(74) *Attorney, Agent, or Firm* — Cooley LLP

(57) ABSTRACT

A system and method for managing pestware on a protected computer is described. The method in one variation includes starting a boot sequence that includes a period when boot drivers are initialized, initiating a kernel-level monitor during the period when boot drivers are initialized, monitoring events with the kernel-level monitor during the boot sequence and managing pestware-related events with the kernel-level monitor before a period in the boot sequence when native applications are capable of running. In variations, a pestware management engine is initialized after an operating system of the protected computer is initialized and the pestware management system both receives an event log of the monitored events and compiles the set of behavior rules utilized by kernel-level monitor.

15 Claims, 6 Drawing Sheets

U.S. PATENT DOCUMENTS

| | | | |
|---|---|---|---|
| 7,484,245 B1 * | 1/2009 | Friedman et al. | 726/27 |
| 2002/0129277 A1 | 9/2002 | Caccavale | |
| 2002/0166059 A1 | 11/2002 | Rickey | |
| 2003/0135791 A1 * | 7/2003 | Natvig | 714/38 |
| 2003/0159070 A1 | 8/2003 | Mayer | |
| 2003/0217287 A1 | 11/2003 | Kruglenko | |
| 2004/0030914 A1 | 2/2004 | Kelley et al. | |
| 2004/0034794 A1 | 2/2004 | Mayer et al. | |
| 2004/0064736 A1 | 4/2004 | Obrecht et al. | |
| 2004/0080529 A1 | 4/2004 | Wojcik | |
| 2004/0143763 A1 | 7/2004 | Radatti | |
| 2004/0187023 A1 | 9/2004 | Alagna et al. | |
| 2004/0225877 A1 | 11/2004 | Huang | |
| 2005/0114687 A1 * | 5/2005 | Zimmer et al. | 713/193 |
| 2005/0120242 A1 | 6/2005 | Mayer | |
| 2005/0125687 A1 * | 6/2005 | Townsend et al. | 713/200 |
| 2005/0138433 A1 | 6/2005 | Linetsky | |
| 2005/0149726 A1 | 7/2005 | Joshi | |
| 2005/0172115 A1 | 8/2005 | Bordorin | |
| 2005/0188272 A1 | 8/2005 | Bordorin | |
| 2005/0216759 A1 * | 9/2005 | Rothman et al. | 713/200 |
| 2005/0257266 A1 | 11/2005 | Cook | |
| 2006/0265761 A1 | 11/2006 | Rochette | |

FOREIGN PATENT DOCUMENTS

WO  PCT/US2007/064490  7/2007

OTHER PUBLICATIONS

U.S. Appl. No. 10/956,578, filed Oct. 1, 2004, Steve Thomas.
U.S. Appl. No. 11/257,609, filed Oct. 25, 2005, filed Oct. 25, 2005, Michael Burtscher.
U.S. Appl. No. 11/237,291, filed Oct. 28, 2005, Philip Maddaloni.
U.S. Appl. No. 11/482,903, filed Jul. 7, 2006, Patrick Sprowls.
U.S. Appl. No. 11/465,680, filed Aug. 18, 2006, Min Wang.
Codeguru, Three Ways to Inject Your Code Into Another Process, by Robert Kuster, Aug. 4, 2003, 22 pgs.
Codeguru, Managing Low-Level Keyboard Hooks With the Windows API for VB .Net, by Paul Kimmel, Apr. 18, 2004, 10 pgs.
Codeguru, Hooking the Keyboard, by Anoop Thomas, Dec. 13, 2001, 6 pgs.
Illusive Security, Wolves in Sheep's Clothing: malicious DLLs Injected Into trusted Host Applications, Author Unknown, http://home.arcor.de/scheinsicherheit/dll.htm 13 pgs.
DevX.com, Intercepting Systems API Calls, by Seung-Woo Kim, May 13, 2004, 6 pgs.
Microsoft.com, How to Subclass a Window in Windows 95, Article ID 125680, Jul. 11, 2005, 2 pgs.
MSDN, Win32 Hooks by Kyle Marsh, Jul. 29, 1993, 15 pgs.
PCT Search Report, PCT/US05/34874, Jul. 5, 2006, 7 Pages.
Bontchev V; "Possible Virus Attacks Against Integrity Programs and How to Prevent Them;" Virus Bulletin Conference, Virus Bulletin Ltd., Abington, GB; Sep. 2, 1992; pp. 131-142, XP000613974.
Yi-Min Wang et al.; "Detecting Stealth Software with Strider Ghostbuster," Dependable Systems and Networks, 2005, DSN 2005, Proceedings, International Conference on Yokohama, Japan 28-0 Jun. 2005, Piscatay, NJ, USA, IEE, Jun. 28, 2005; pp. 368-377; XP010817813; ISBN: 0-7695-2282-3.

* cited by examiner

MALWARE MANAGEMENT THROUGH KERNEL DETECTION

RELATED APPLICATIONS

The present application is related to commonly owned and assigned application Ser. No. 10/956,578, entitled System and Method for Monitoring Network Communications For Pestware, and application Ser. No. 11/237,291, entitled Client Side Exploit Tracking, which are incorporated herein by reference.

FIELD OF THE INVENTION

The present invention relates to computer system management. In particular, but not by way of limitation, the present invention relates to systems and methods for controlling pestware or malware.

BACKGROUND OF THE INVENTION

Personal computers and business computers are continually attacked by trojans, spyware, and adware, collectively referred to as "malware" or "pestware." These types of programs generally act to gather information about a person or organization—often without the person or organization's knowledge. Some pestware is highly malicious. Other pestware is non-malicious but may cause issues with privacy or system performance. And yet other pestware is actual beneficial or wanted by the user. Wanted pestware is sometimes not characterized as "pestware" or "spyware." But, unless specified otherwise, "pestware" as used herein refers to any program that collects and/or reports information about a person or an organization and any "watcher processes" related to the pestware.

The design and implementation of current and future pestware incorporates techniques that make the pestware difficult to identify, remove, or even to detect. These techniques, and likely future improvements to them, rely on patches, hooks and yet-to-be-discovered methods for modifying the behavior of a computer operating system itself. Such techniques render current detection tools ineffective by intercepting and altering the results of operating system queries from the tools that must rely on the dependability of operating system calls to return lists of running programs, file system and registry contents, for example.

Detection of pestware that uses these cloaking techniques is often ineffective by the real-time shields that existing anti-pestware applications utilize because these real-time shields begin execution after pestware has been able to execute and modify the operating system. FIG. 3, for example, illustrates the boot and operating system sequences that demonstrate the inability of user-mode services or applications to detect and prevent pestware (e.g., a Rootkit) that loads before them in a boot sequence. Periodic scanning for pestware is particularly ineffective because it leaves a window of time between scans in which pestware can execute and cloak itself. Accordingly, current software is not always able to identify and remove pestware in a convenient manner and will most certainly not be satisfactory in the future.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one embodiment, the invention may be characterized as a method for managing pestware on a computer. The method in this embodiment includes starting a boot sequence and initiating a kernel-level monitor during the period in the boot sequence when boot drivers are initialized. In addition, while the boot sequence is being carried out, the kernel-level monitor tracks events during the boot sequence and manages, in accordance with behavior rules, the events that are pestware-related events. In variations, the method includes initializing, after an operating system of the protected computer is initialized, a pestware management engine. The pestware management engine in this embodiment receives an event log from the kernel-level monitor and compiles the set of behavior rules for the kernel-level monitor.

In another embodiment, the invention may be characterized as a system for managing pestware on a protected computer. The system in this embodiment includes a kernel-level monitor configured to be initialized before at least a portion of boot drivers on the protected computer are initialized and to monitor, according to a set of behavior rules, activities on the protected computer before a period in a boot sequence of the protected computer when native applications are capable of running. In addition, the system includes a pestware management engine configured to both be initialized after an operating system of the protected computer is initialized and to compile the set of behavior rules.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
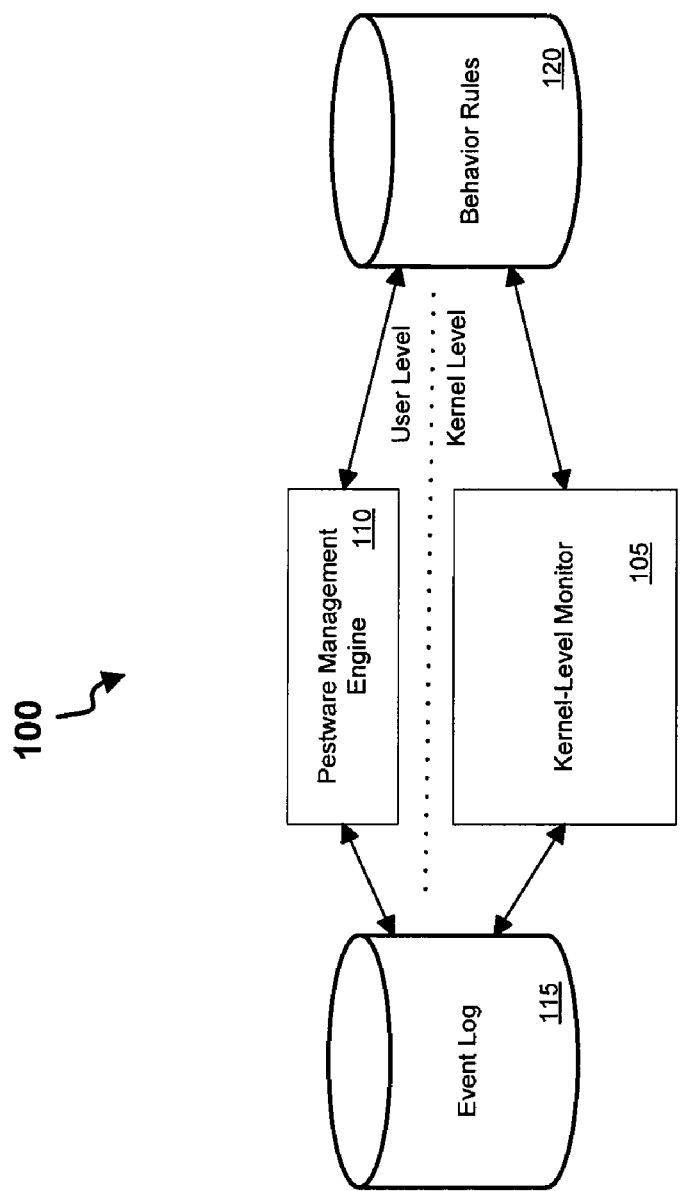
FIG. 1 is a block diagram depicting a pestware management system in accordance with an exemplary embodiment of the present invention.

Referring now to the drawings, where like or similar elements are designated with identical reference numerals throughout the several views, and referring in particular to FIG. 1, it illustrates a block diagram 100 of one implementation of the present invention. This implementation includes four components: a kernel-level monitor 105, a pestware management engine 110, event storage 115 and behavior rule storage 120.

The kernel-level monitor 105 and a pestware management engine 110 can be implemented in software or hardware. And if implemented in software, the modules can be designed to operate on any type of computer system including WINDOWS and Linux-based systems Additionally, the software can be configured to operate on personal computers and/or servers. For convenience, embodiments of the present invention are generally described herein with relation to WINDOWS-based systems. Those of skill in the art can easily adapt these implementations for other types of operating systems or computer systems.

The event storage 115 and behavior rule storage 120 may be realized by a single magnetic hard drive, distributed hard drives or non-volatile memory. In some variations, the event storage 115 may be implemented with volatile memory.

Referring first to the kernel-level monitor 105, in the exemplary embodiment it is responsible for detecting pestware or pestware activity on a protected computer or system. (The term "protected computer" is used to refer to any type of computer system, including personal computers, handheld computers, servers, firewalls, etc.) In several embodiments. the kernel-level monitor 105 begins execution early in the boot and operating system loading process on the protected computer, and as discussed further herein, the kernel-level monitor 105 obtains (e.g., in a secure manner), a most recent set of behavior rules from the behavior rules storage 120 that was previously compiled by the pestware management engine 110.

The kernel-level monitor 105 additionally uses several techniques that allow it to intercept and monitor various operating system behaviors, including attempts by pestware to modify the behavior of the operating system through the use of patches and hooks or by invoking other mechanisms that could be used to alter information passed to or from the operating system.

Moreover, the kernel-level monitor 105 in the exemplary embodiment also provides mechanisms that can prevent, disable or disallow attempts by pestware to use or create patches, hooks and other methods required for intercepting or altering operating system information. In addition, the kernel-level monitor 105 identifies specific attempts by other software by locating the specific instance within the set of behavior rules 120 generated by the pestware management engine 110.

Beneficially, the kernel-level monitor 105 in the exemplary embodiment also constructs and stores an event log in the event storage 115 that contains details for each of the intercepted and monitored events detected so that after the pestware management engine 110 executes, it acquires the event log from the event storage module 115.

The pestware management engine 110 in the present embodiment identifies, by examining the event log created by the kernel-level monitor 105, instances of known pestware, suspicious events by unknown software, and other patterns of events that may be useful in identifying pestware.

In addition, the pestware management engine 110 can add to or modify the common set of behavior rules that are utilized by kernel-level monitor 105 the next time the kernel-level monitor 105 loads and executes. In this way, the pestware management engine 110 is able to provide updated information about pestware-related events that should be prevented by the kernel-level monitor 105 during future boot operations on the protected computer.

Advantageously the ability to first observe, using the kernel-level monitor 105, events associated with the loading, execution and behaviors of pestware, followed by the pestware management engines's 110 incorporation of the events into the behavior rules 120 allows, in subsequent boot operations, the kernel-level monitor 105 to prevent or deny the events from happening. Moreover, the pestware management module 110 may receive updated information about events that should be prevented from a remote host (not shown). The above-identified application entitled Client-side Exploit Tracking includes details about developing behavior rules at a centralized host location that may be pushed out to protected computers.

Figure 2:
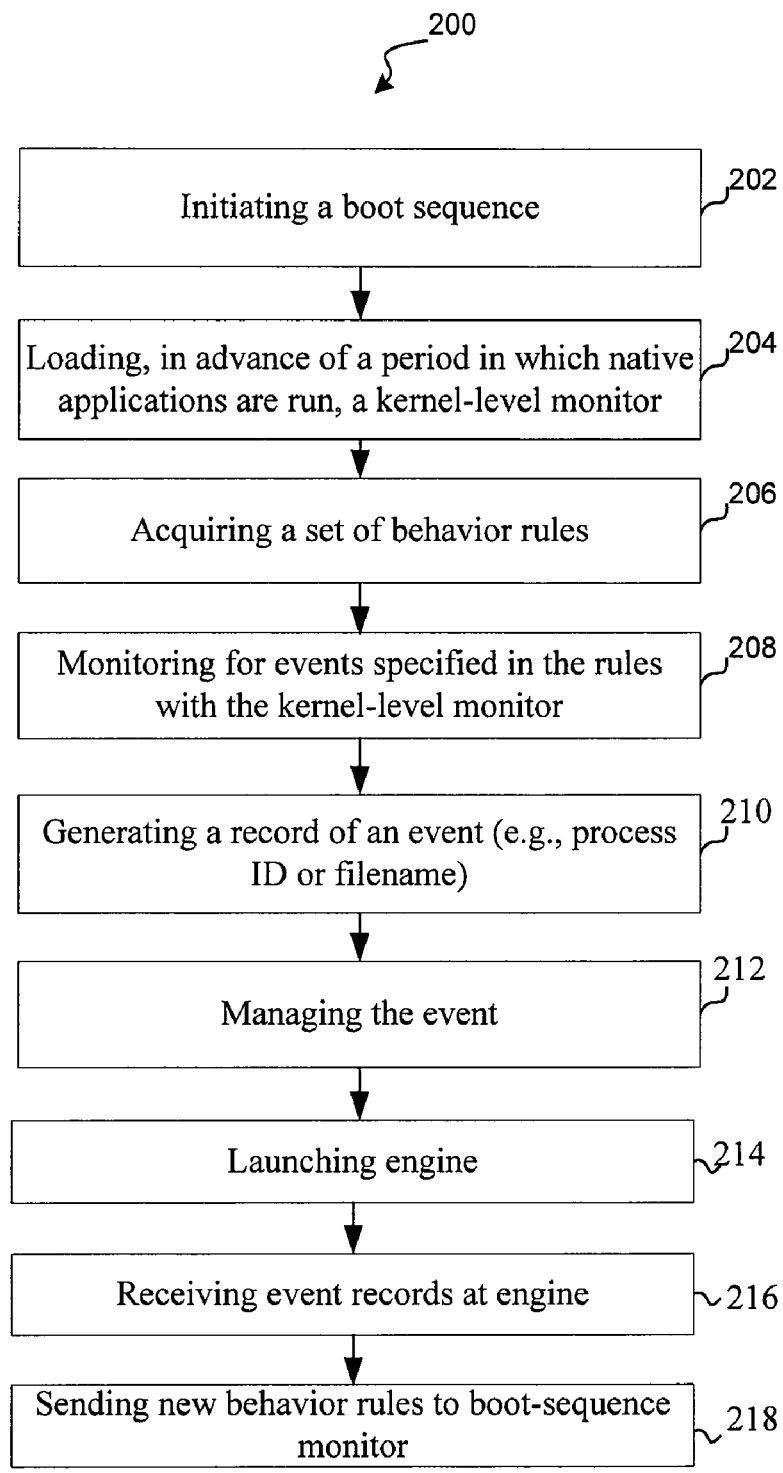
FIG. 2 is a flowchart depicting steps carried out in accordance with an exemplary embodiment of the present invention.
Figure 3:
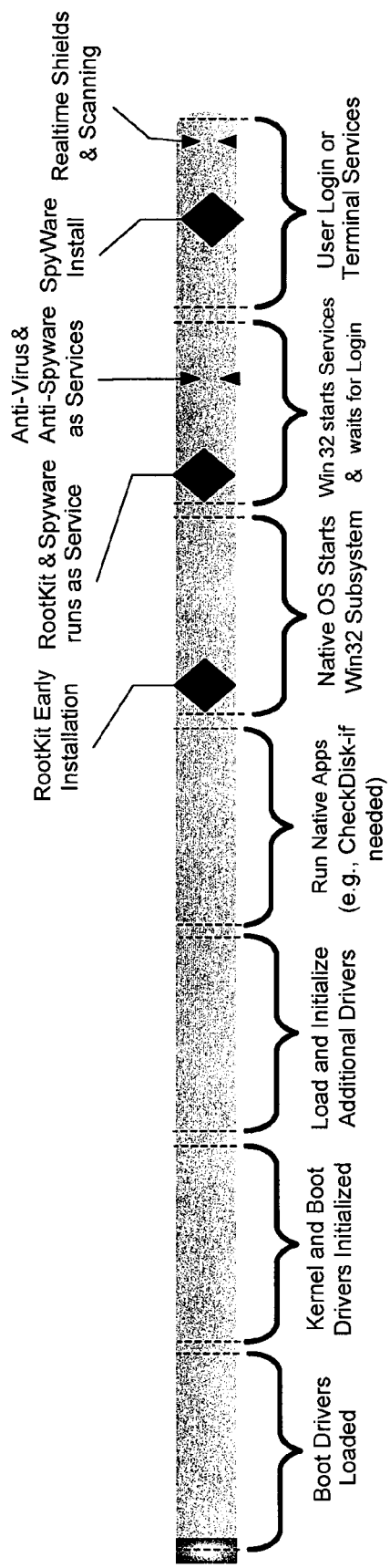
FIG. 3 is a timing diagram depicting a boot sequence in accordance with prior art pestware management techniques.

Referring next to FIG. 2, it is a flowchart of one method for managing pestware. In this method, a boot sequence of the protected computer is initiated (e.g., by a user of the protected computer)(Block 202), and in advance of a period when native applications (e.g., checkdisk) of the protected computer beginning execution, the kernel-level monitor 105 is initialized (Block 204).

In several embodiments, for example, the kernel-level monitor 105 is loaded with boot drivers and initialized before at least some of the boot drivers. In some embodiments, the kernel-level monitor 105 is initialized before any of the boot drivers so as to be capable of monitoring the initialization of the boot drivers. In one embodiment, for example, a low tag number (e.g., the lowest tag number) is associated with the kernel-level monitor 105 so that the kernel-level monitor 105 is initialized before boot drivers, with higher tag numbers, are initialized. It is contemplated that once the kernel-level monitor 105 is provided with a low tag number, registry keys of the protected computer may be protected so as to prevent pestware from subsequently altering the tag order.

In yet another embodiment, a tag number of zero is associated with the kernel-level monitor 105 and the operating system of the protected computer is altered so as to allow a tag number of zero to be initialized first, before any boot drivers are initiated.

Figure 4:
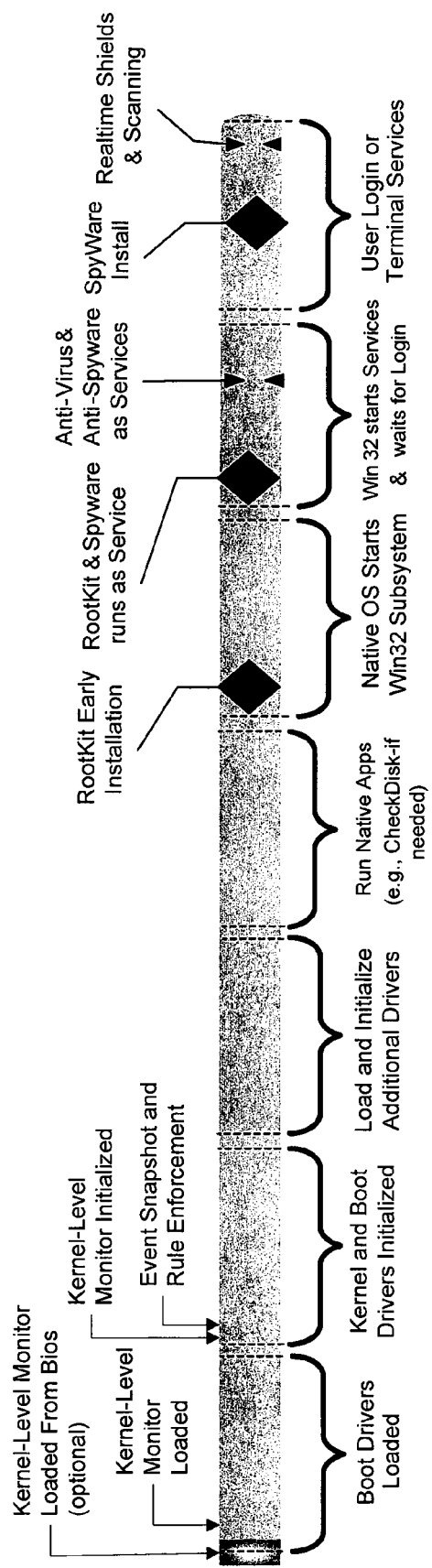
FIG. 4 is a timing diagram depicting a boot sequence in accordance with pestware management techniques of several embodiments of the present invention.

Referring briefly to FIG. 4, which depicts an exemplary boot and operating system load sequence, the kernel-level monitor 105 in the exemplary embodiment is initialized before a period when native applications may be run. More specifically, as depicted in FIG. 4, the kernel-level monitor 105 is loaded in the boot sequence when boot drivers are loaded and initialized at a very early (e.g., first) stage during the period in which the boot drivers are initialized. As depicted in FIG. 4, in an alternative embodiment, the kernel-level monitor 105 is loaded from a BIOS of the protected computer.

In many embodiments of the invention, the kernel-level monitor 105 is realized by a Windows device driver that can operate in the constraints imposed on the boot drivers, which are needed to operate peripherals (e.g., keyboard, mouse, monitor, hard drive, etc.) during the initial boot process.

During the time when the kernel-level monitor 105 is loaded and initialized, driver hooks and monitoring mechanisms that are utilized by the kernel-level monitor 105 are placed into the operating system kernel. Referring again to FIG. 4, this time period includes the time period depicted as "Event Snapshot and Rule Enforcement." In the exemplary boot sequence depicted in FIG. 4, the kernel-level monitor 105 monitors events on an ongoing basis after being initialized early during the period in which the boot drivers are loaded.

Referring again to FIG. 2, when the kernel-level monitor 105 begins execution, it acquires the most recent set of behavior rules (e.g., in a secure manner) from behavior rule storage 120 (Block 206) and begins monitoring for the events specified in the rules (Block 208). When a monitored event is detected, details of the event (e.g., ProcessID and/or filename) are added to an event record (Block 210) that is added to event storage 115, which may be either an in-memory or a file-based log of events.

As shown in FIG. 2, the kernel-level monitor 105 then manages the protected computer in response to the event in accordance with the behavior rules (Block 212). For example, if a detected event is marked for denial or deletion in the behavior rules, the kernel-level monitor 105 either prevents the operating system from receiving the request or it forces the operating system to reject the request.

In the exemplary embodiment, as the boot sequence continues, the kernel-level monitor 105 continues to run independently, collecting event log data (e.g., during the periods in which additional drivers are initialized and when native applications are capable of executing). As depicted in FIG. 4, as the boot sequence progresses, it is possible that a rootkit or another variety of pestware loads as a driver or service. In the context of a Windows operating system, for example, during the period that the native operating system starts the Win32 subsystem, it is possible that a rootkit or other pestware may load as a driver or service. Events that are generated by such a pestware driver or service are monitored by the kernel-level monitor 105, added to the event log, and if the behavior rules include specific instance data indicating the event is a pestware-related event, the kernel-level monitor 105 denies or disables the rootkit's attempts to install.

As shown in FIG. 4, in a Windows-based system, as Win32 starts global services, the kernel-level monitor 105 again monitors and possibly prevents spyware and rootkits from installing. Also during this period, the pestware management engine 110 is started as a service (Block 214).

In several embodiments, one of the tasks of the pestware management engine 110 is to communicate securely with the kernel-level monitor 105 so as to retrieve the event logs for examination and analysis (Block 216). In several embodiments, the event logs are compared against factors known to be associated with pestware so as to identify a likelihood that the events in the event log are pestware related events. In addition, the event log may be sent to a centralized host, which collects information about activities at protected computers and generates weighted factors which are pushed out to the protected computers and utilized to help identify pestware at the protected computer. The above-identified application entitled Client Side Exploit Tracking includes details of techniques that may be used to identify pestware-related events from the event logs.

In the exemplary embodiment, after the pestware management engine 110 is launched, it continues to communicate with the kernel-level monitor 105 so as to receive new events that are detected by the kernel-level monitor 105 and to send new behavior rules to the kernel-level monitor 105 as they are developed. If the pestware management engine 110 should cease execution, the kernel-level monitor 105 can continue to collect event logs and protect against those events covered by the current behavior rules until the pestware management engine 110 restarts and communicates once again with the kernel-level monitor 105.

Figure 5:
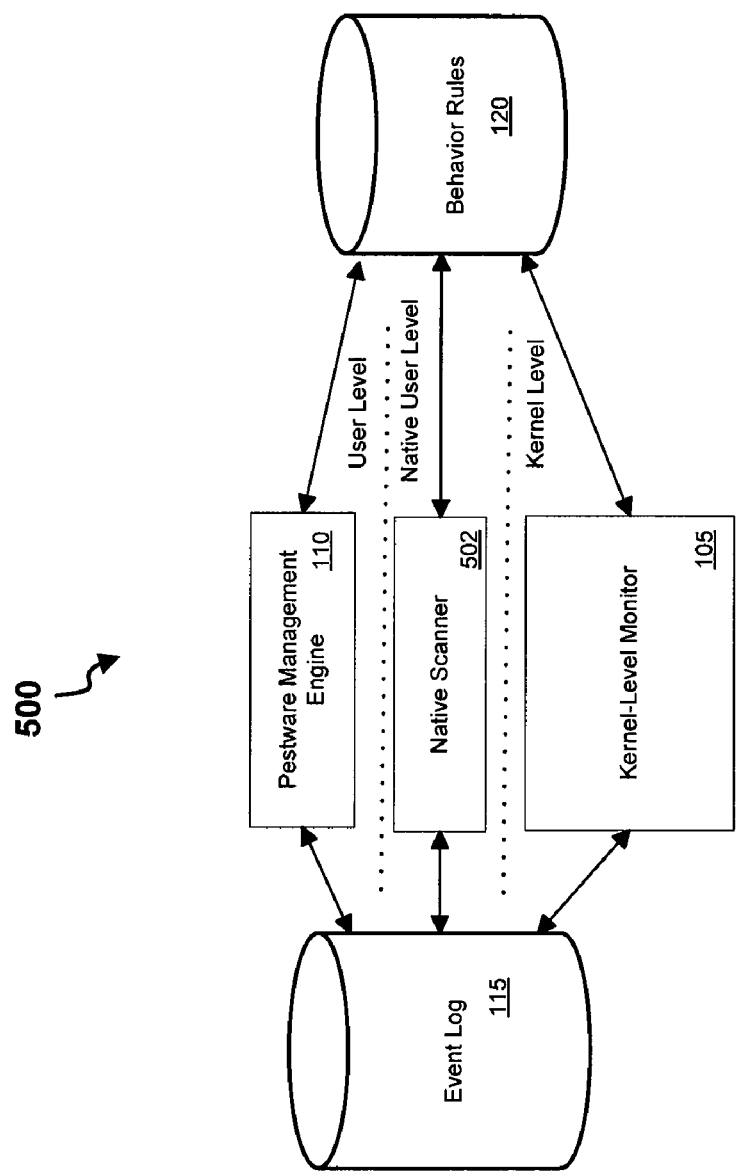
FIG. 5 is a block diagram of a pestware management system in accordance with another embodiment of the present invention.
Figure 6:
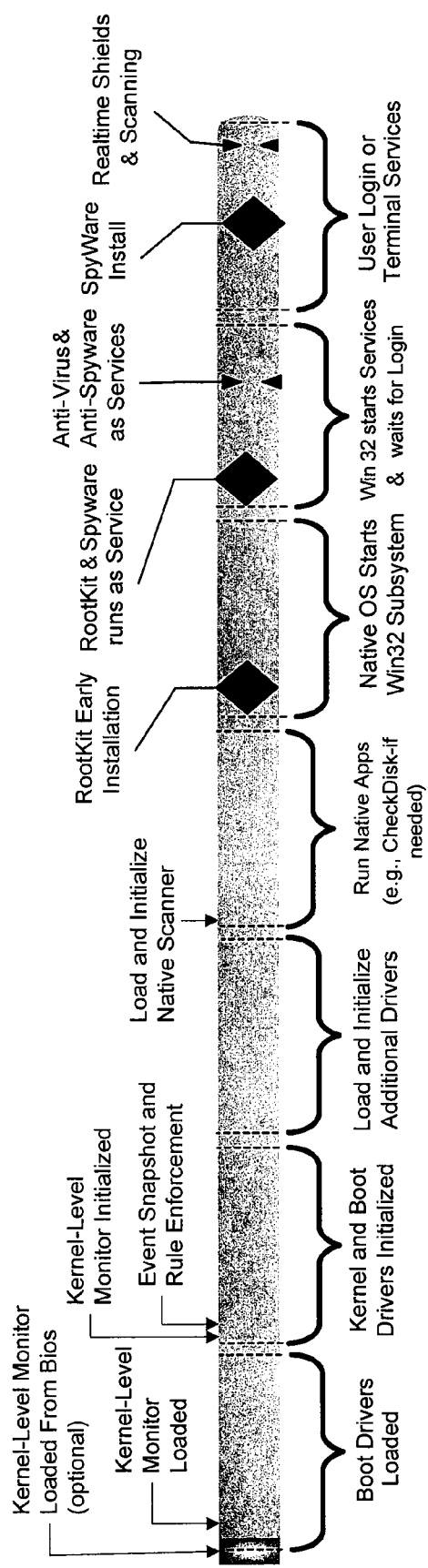
FIG. 6 is a timing diagram depicting another boot sequence in accordance with another embodiment of the present invention.

Referring next to FIG. 5, shown a block diagram 500 of another implementation of the present invention. In this embodiment, a native scanner 502 is shown operating at a native user level of the protected computer. In several embodiments, the native scanner 502 is initialized early during the period of the boot sequence during which native applications may be run. In the embodiment depicted in FIG. 5, for example, the native scanner 502 is the first non-kernel application to initialize so as to be capable of monitoring the protected computer before any other native applications are initialized.

In operation, the native scanner 502 is configured to examine registry, filesystem and other portions of a protected computer before the Win32 subsystem and most services are loaded and executed. In this way, additional information is generated that the pestware management engine 110 can later examine and utilize in order to generate new behavior rules for the kernel-level monitor 105.

In some embodiments, the native scanner 502 may be enabled with pestware management functions such as memory and file scanning. The above-identified application entitled: System and Method for Monitoring Network Communications includes details of many pestware management functions that may be incorporated into the native scanner 502.

In conclusion, the present invention provides, among other things, a system and method for managing pestware during a boot sequence of a protected computer. It should be recognized, however, that embodiments of the present invention certainly have applications that extend beyond the boot sequence period of operation when the protected computer is operating in a user mode. Moreover, those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for managing pestware on a computer comprising:
   starting a boot sequence, the boot sequence including a period when boot drivers are initialized;
   initiating a kernel-level monitor during the period when boot drivers are initialized; monitoring, while the boot sequence is being carried out, events with the kernel-level monitor;
   managing pestware-related events with the kernel-level monitor before a period in the boot sequence when the computer is configured to run native applications, the period in the boot sequence when the computer is configured to run native applications being after a kernel is loaded and before a Win32 subsystem is loaded;
   loading and initializing a native scanner during the period in the boot sequence when the computer is configured to run native applications;
   managing pestware-related events during the period in the boot sequence when the computer is configured to run native applications;
   acquiring a set of behavior rules, wherein the managing pestware-related events is carried out in accordance with the behavior rules; and
   scanning, using the native scanner, a registry of the computer for pestware during the period in the boot sequence when the computer is configured to run native applications.

2. The method of claim 1, including: launching, after an operating system is initiated, a pestware management engine;

wherein the acquiring the set of behavior rules includes acquiring at least a portion of the behavior rules from behavior rules compiled by the pestware management engine.

3. The method of claim 1, including:

generating, in response to the monitoring, a record of events, the record of events including the pestware-related events;

analyzing the record of events so as to identify the pestware-related events; and modifying the set of behavior rules so as to prevent the pestware-related events.

4. The method of claim 3, wherein the record of events includes information selected from the group consisting of process identification information, file identification information and hook generation information.

5. The method of claim 1, including:

managing pestware-related events with the kernel-level monitor after the period in the boot sequence when the computer is configured to run native applications.

6. The method of claim 1, wherein the kernel-level monitor is selected from the group consisting of a device driver, a kernel-mode DLL and a virtual machine.

7. The method of claim 1, wherein the initiating the kernel-level monitor includes loading the kernel-level driver from a BIOS of the computer.

8. The method of claim 1, wherein the initiating the kernel-level monitor is before the boot drivers are initialized.

9. The method of claim 8, wherein the monitoring includes monitoring the boot sequence while the boot drivers are initialized.

10. A system for managing pestware on a protected computer comprising:

a processor;

a kernel-level monitor executed by the processor, the kernel-level monitor configured to be initialized before at least a portion of boot drivers on the protected computer are initialized and to monitor, according to a set of behavior rules, activities on the protected computer before a period in a boot sequence of the protected computer when the computer is configured to run native applications, the period when the computer is configured to run native applications being after a kernel is loaded but before a Win32 subsystem is loaded;

a pestware management engine executed by the processor that is configured to both be initialized after an operating system of the protected computer is initialized and to compile the set of behavior rules; and a native scanner executed by the processor that is initialized during the period in the boot sequence of the protected computer when the computer is configured to run native applications, wherein the native scanner is configured to scan files that are utilized by an operating system of the protected computer;

wherein the native scanner is configured to scan a registry of the protected computer for pestware during the period in the boot sequence of the protected computer when the computer is configured to run native applications.

11. The system of claim 10, wherein the kernel-level monitor is selected from the group consisting of device driver, a kernel-mode DLL and a virtual machine.

12. The system of claim 10, wherein the kernel-level monitor is configured to prevent, in accordance with the behavior rules, pestware from carrying out pestware-related activities.

13. The system of claim 12 including a memory, wherein the kernel-level monitor is configured to store, before the period in a boot sequence of the protected computer when the computer is configured to run native applications, information about potential pestware-related events in an event log in the memory, wherein the memory is selected from the group consisting of a magnetic storage medium and volatile memory.

14. The system of claim 13, wherein the pestware management engine is configured to read the event log and modify the set of behavior rules based upon the information about potential pestware-related events so as to prevent subsequent pestware-related events during the boot sequence.

15. The system of claim 10, wherein the pestware management engine resides on the protected computer.

* * * * *